(12) United States Patent
O'Rear et al.

(10) Patent No.: US 9,975,082 B2
(45) Date of Patent: May 22, 2018

(54) PROCESS, METHOD, AND SYSTEM FOR REMOVING MERCURY FROM FLUIDS

(71) Applicant: Chevron U.S.A. Inc., San Ramon, CA (US)

(72) Inventors: Dennis John O'Rear, Petaluma, CA (US); Wei Wang, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days. days.

(21) Appl. No.: 15/155,842

(22) Filed: May 16, 2016

(65) Prior Publication Data

US 2016/0332108 A1  Nov. 17, 2016

Related U.S. Application Data

(60) Provisional application No. 62/161,304, filed on May 14, 2015.

(51) Int. Cl.
| | |
|---|---|
| *B01D 53/64* | (2006.01) |
| *B01D 53/14* | (2006.01) |
| *B01D 53/96* | (2006.01) |
| *B01D 53/78* | (2006.01) |
| *C10L 3/10* | (2006.01) |

(52) U.S. Cl.
CPC ..... *B01D 53/1493* (2013.01); *B01D 53/1425* (2013.01); *B01D 53/64* (2013.01); *B01D 53/78* (2013.01); *B01D 53/96* (2013.01); *C10L 3/101* (2013.01); *B01D 53/1406* (2013.01); *B01D 2251/108* (2013.01); *B01D 2251/50* (2013.01); *B01D 2252/20* (2013.01); *B01D 2252/202* (2013.01); *B01D 2252/205* (2013.01); *B01D 2252/40* (2013.01); *B01D 2256/245* (2013.01); *B01D 2257/602* (2013.01); *B01D 2258/0283* (2013.01)

(58) Field of Classification Search
CPC .. B01D 53/14; B01D 53/64; B01D 2251/108; B01D 2257/60; B01D 2257/602; B01D 2258/0283; B01D 2259/40083
See application file for complete search history.

(56) References Cited

U.S. PATENT DOCUMENTS 9,114,360 B2 * 8/2015 Sasson ............... B01D 53/1425

FOREIGN PATENT DOCUMENTS

| WO | WO 2013114350 A1 * | 8/2013 | ......... B01D 53/1425 |
| WO | WO 2016183581 A2 * | 11/2016 | ............. B01D 53/78 |

* cited by examiner

*Primary Examiner* — Timothy C Vanoy
(74) *Attorney, Agent, or Firm* — Howard V. Owens

(57) ABSTRACT

Elemental mercury is removed from a gas by contacting it with a halogen dissolved in an organic solvent. The mercury accumulates in the organic solvent and can be removed by extraction with an aqueous solution with a complexing agent, by adsorption, and by combinations. The absorption process can also operate by use of a series of absorbers which have successively higher concentrations of halogen in the solution and which successively remove more the mercury from the gas. A portion of the solvent in the last absorber can be cascaded to the previous absorber in the series. In one embodiment, the process is carried out at a temperature of absorber at less than or equal to 28° C. above the higher of the water dew point and the hydrocarbon dew point. The mercury waste from the process is produced as either an aqueous solution or a small volume of mercuric sulfide.

24 Claims, 1 Drawing Sheet

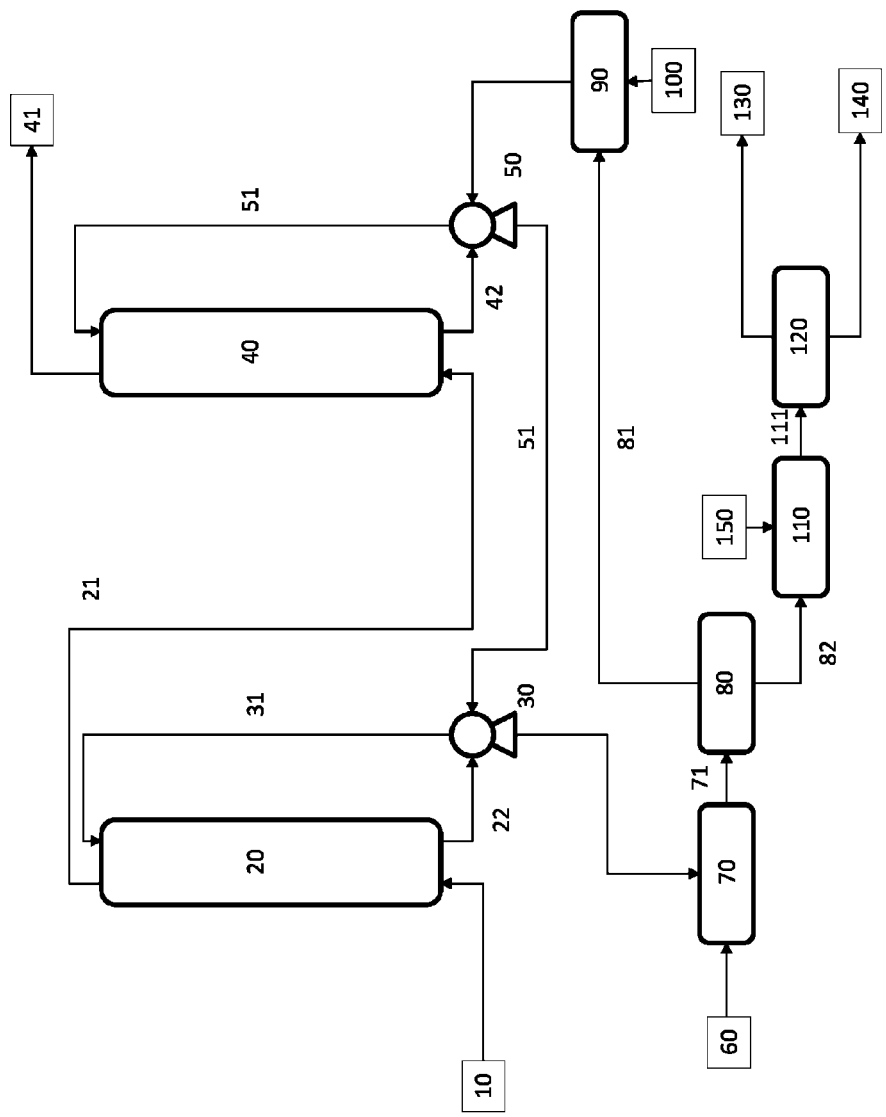

PROCESS, METHOD, AND SYSTEM FOR REMOVING MERCURY FROM FLUIDS

CROSS-REFERENCE TO RELATED APPLICATIONS

This application claims priority to U.S. Provisional Patent Application 62/161,304, filed May 14, 2015.

BACKGROUND

Mercury adsorbers have been used to remove heavy metals such as mercury from the natural gas to specifications, e.g., 0.1 μg/m3 (micrograms of Hg per normal cubic meter of gas), with the use of an adsorbent bed of carbon, zeolite, or supported metals known in the art. The adsorbents are rather expensive and require disposal as a hazardous waste, or shipped to a re-processing facility. When natural gas is to be liquefied using mercury-reactive alloys, such as aluminum, the mercury content of the gas must be reduced to or below 0.01 μg/m3.

When condensable hydrocarbons or water is present in the gas and with the use of commercially available adsorbents, condensed liquids may block the adsorption of the elemental mercury or cause the adsorbent to lose mechanical strength. The weakened adsorbent can crumble and may lead to plugging in the adsorber. In crude and gas production, the mercury-containing gas is often obtained from separators or from compressor-chillers. In both cases, the gas can be at or near its water and/or hydrocarbon dew point. To minimize problems from loss of the adsorbent, the gas is often heated to temperatures above its dew point. Alternatively, the gas can be chilled and the water and/or hydrocarbons condensed. The gas is then reheated prior to the mercury adsorption step. In both processes, expensive equipment is required. Also, the condensed water and hydrocarbon liquids from the second alternative can contain mercury and require additional treatment. It is recommended that hydrocarbon gases be heated to 28° C. above their hydrocarbon dew point to assure that no liquids condense.

Disposal of the spent adsorbents can be difficult in some locations with expensive retorting or disposal in hazardous waste landfills. Alternative disposal methods for the mercury are desired.

There is still a need for improved methods and systems to remove volatile mercury from fluids such as natural gas, vent gas or flue gas, allowing for the optimization of plant operations to minimize the equipment corrosion and mercury emission.

There is still a need for a process to remove mercury from gas and which is not affected by condensable hydrocarbons and water, to capture the mercury as either an aqueous waste that can be disposed by injection in a deep well, or as a small volume of mercury sulfide.

SUMMARY

In one aspect, the invention relates to a method for treating a gas stream to reduce its mercury concentration. The method comprises: contacting the gas stream having a first mercury concentration with a first organic solvent containing a halogen in a first absorber to extract at least a portion of the mercury from the gas stream forming a mercury-halogen complex in the first organic solvent and a treated gas having a reduced concentration of mercury, and contacting a portion of the first organic solvent containing the mercury-halogen complex with a complexing agent in water forming a recovered organic solvent and an aqueous phase containing an aqueous mercury complex; wherein the treated gas has reduced concentration of mercury of less than 50% of the first mercury concentration.

DRAWINGS

FIG. 1 is block diagram illustrating an embodiment of a process to remove mercury.

DETAILED DESCRIPTION

The following terms will be used throughout the specification and will have the following meanings unless otherwise indicated.

"Aqueous mercury complex" is the mercury species in aqueous solution formed by reaction of the organic mercury-halogen complex in the organic solvent into an aqueous phase that also contains a complexing agent.

"Hydrocarbon Dew Point" refers to the temperature (at a given pressure) at which the hydrocarbon components of any hydrocarbon-rich gas mixture, such as natural gas, will start to condense out of the gaseous phase. It is often also referred to as the HDP or the HCDP. The hydrocarbon dew point is a function of the gas composition as well as the pressure. The hydrocarbon dew point can be calculated based on the gas composition or measured. While numerous techniques are available to measure or calculate the hydrocarbon dew point, if these methods are in discrepancy, the Bureau of Mines Manual Dew Point Tester should be used.

"Water Dew Point" refers to the temperature at which water in a sample of gas at constant pressure condenses into liquid water at the same rate at which it evaporates. At temperatures below the dew point, water will leave the gas. The condensed water is called dew when it forms on a solid surface. The condensed water is called either fog, mist or a cloud when it is present in the gas. The water dew point can be measured by use of ASTM D1142.

"Halogens" refers to diatomic species from the column of the periodic table headed by fluorine, for example $F_2$, $Cl_2$, $Br_2$, $I_2$. Halogens include mixed species such bromine monochloride, BrCl.

"Halogen-reactive impurities" refer to impurities in the gas other than mercury which can react with halogens. These include hydrogen sulfide, ammonia, light mercaptans, and carbonyl sulfide.

"Anion Exchange Resin" refers to a type of ion exchange resin designed to remove anions. Anion resins may be either strongly or weakly basic. Strongly base anion resins can maintain their positive charge across a wide pH range, whereas weakly base anion resins at high pH. Weakly basic resins do not maintain their charge at a high pH because they undergo deprotonation. They do, however, offer excellent mechanical and chemical stability. This, combined with a high rate of ion exchange, make weakly base anion resins well suited for the organic salts. For anion resins, regeneration typically involves treatment of the resin with a strongly basic solution, e.g. aqueous sodium hydroxide. During regeneration, the regenerant chemical is passed through the resin and trapped negative ions are flushed out, renewing the resins' exchange capacity.

"Ion Exchange Resin" (or ion-exchange polymer) refers to an insoluble matrix (or support structure), e.g., in the form of small (0.5-1 mm diameter) beads, fabricated from an organic polymer substrate. In one embodiment, the matrix is in the form of porous beads, providing a high surface area. The trapping of ions occurs with concomitant releasing of other ions; thus the process is called ion-exchange. There are multiple types of ion-exchange resin. Most commercial resins are made of polystyrene sulfonate. Ion-exchange resins are widely used in different separation, purification, and decontamination processes.

"Mercury sulfide" may be used interchangeably with HgS, referring to mercurous sulfide, mercuric sulfide, or mixtures thereof. Normally, mercury sulfide is present as mercuric sulfide with a stoichiometric equivalent of approximately one mole of sulfide ion per mole of mercury ion. Mercury sulfide can be in any form of cinnabar, meta-cinnabar, hyper-cinnabar and combinations thereof.

"Metal Organic Frameworks (MOFs)" refers to a type of molecular sieve consisting of metal ions or clusters coordinated to often rigid organic molecules to form one-, two-, or three-dimensional structures that can be porous. Typically metal organic frameworks are microporous molecular sieves.

"Metal Oxides" are inorganic solids containing of one or more metals and oxygen. These are commonly used in the chemical industry as adsorbents and as supports for catalysts. Examples of metal oxides include alumina, silica, amorphous aluminosilicates and amorphous borosilicates. They are commonly produced as extrudates, chips, powders, granules, or pellets. The extrudates can have a variety of shapes, such as lobes, to assist in adsorption and catalysis. Metal oxides have a range of pore sizes but the average size puts them in the category of mesoporous and macroporous materials.

"Microporous", "Macroporous" and "Mesoporous": Microporous materials have pore diameters of less than 2 nm (20 Å) and macroporous materials have pore diameters of greater than 50 nm (500 Å). The mesoporous category lies in the middle with pore diameters between 2 and 50 nm (20-500 Å).

"Molar ratio of Halogen/Hg" refers to the moles of iodine in the organic solvent to moles of elemental mercury in the gas. In a laboratory gas absorber, the ratio is calculated from the amount of mercury in the incoming gas; and the amount of iodine in the solution in the absorber. In a commercial counter-current absorber, the ratio is calculated from the concentration of iodine in the inlet stream of organic solvent and the rate of this solvent; and the concentration of mercury in the inlet gas stream and the rate of this gas stream.

"Molecular Sieves": refers to a material with very small holes of precise and uniform size. These holes are small enough to block large molecules while allowing small molecules to pass. Molecular sieves are used as desiccants, adsorbents and catalysts. Some examples include activated charcoal, silica gel, zeolites, natural clays, synthetic clays, metal organic frameworks and self-assembled monolayers on mesoporous supports. The diameter of a molecular sieve is measured in Angstroms (Å) or nanometers (nm).

"Organic Mercury-halogen complex" refers to the reaction product between gas phase elemental mercury and halogen dissolved in an organic solvent. The mercury-halogen complex is not significantly volatile at room temperature and remains in the organic solution in the absorber. It can however be extracted with complexing agents to form an aqueous mercury complex. Without wishing to be bound by theory, it is believed that the organic mercury-halogen complex is neutral-valent $HgX_2$, where X refers to the halogen.

"Organic solvent" refers to a material that is liquid at room temperature and which contains hydrogen and carbon. Examples of organic solvents include naphtha, diesel, jet fuel, aromatic solvents, paraffinic solvents, white oils, alcohols (such as methanol, ethanol, and propanol), distillates, crude oil, condensates, and blends of these. In one embodiment, organic solvents that do chemically react with the halogen are used, e.g., paraffinic solvents such as white oil, a highly refined mineral oil. The aromatic content of the organic solvent is 10% or less in one embodiment; 1% or less in a second embodiment; and 0.1% or less in a third embodiment.

"Organic solution" is a mixture of an organic solvent with a halogen. When used to remove mercury, the organic solution will also contain organic mercury-halogen complexes.

"Selenium modified adsorbent" is the selenium analog of any of the following sulfur-containing adsorbents: sulfur-containing polymer, sulfur treated metal oxides, sulfur-treated carbon and thiol-modified SAMMS™. The selenium can be incorporated by use of any selenium reagent, including organic selenides (RSeH) where R is an alkyl, aryl or other carbon-containing ligand, selenous acid, ect.

"Self-Assembled Monolayers on Mesoporous Supports" Refers to a material developed by the Pacific Northwest National Laboratory and trademarked as SAMMS™, which can be modified by use of thiols. An example of the preparation and use of thiol-modified SAMMS™ for the removal of cationic mercury dissolved in water is described in Prepr. Pap.-Am. Chem. Soc., Div. Fuel Chem. 2004, 49 (1), 288, incorporated herein by reference in its entirety.

"Sulfur-Containing Polymer" is a polymer containing sulfur groups, such as thiophene or thiourea. The sulfur groups can be either part of the polymer backbone or on side chains.

"Sulfur-treated metal oxides and Sulfur-treated carbon" refers to metal oxides and carbon respectively that have been treated with a sulfur compound. Examples of the sulfur compounds include thiosulfates, polysulfides, thiourea, and combinations. The percent sulfur in the sulfur-treated metal oxide or carbon is greater than or equal to 1% and less than or equal to 90%. In another embodiment, the percent sulfur is greater than or equal to 5% and less than or equal to 50%. In yet another embodiment, the percent sulfur is greater than or equal to 10% and less than or equal to 30%.

"Sulfur-treated MOF" are metal organic framework (MOFs) that are have thiol functionality added.

"Zeolites" refer to microporous, molecular sieves commonly used as commercial adsorbents and catalysts. Compositions of zeolites include silica with alumina (aluminosilicates) and silica with boron (borosilicates).

In one embodiment, the invention relates to a method to remove elemental mercury from a gas by absorption in a solution of halogen in an organic solvent. The process is very efficient and is close to stoichiometric, allowing for efficient use of the halogen reagents.

The mercury accumulates in the organic solvent and can be removed by extraction with an aqueous solution with a complexing agent, by adsorption, and by combinations. The absorption process can also operate by use of a series of absorbers which have successively higher concentrations of halogen in the solution and which successively remove more the mercury from the gas. A portion of the solvent in the last absorber can be cascaded to the previous absorber in the series. This approach enables high usage of the halogen reagent while achieving low levels of mercury in the product gas.

Because the mercury is absorbed in a solution and not adsorbed on a solid, concerns over the presence of condensed liquids in the gas are reduced or eliminated. The condensed liquids can be either water or hydrocarbons.

While both might accumulate in the organic solvent, the water can be separated by gravity, and the hydrocarbons can be allowed to accumulate or stripped off. The process is resistant to problems created by condensing water and hydrocarbons. It can operate when the temperature of the absorber is less than or equal to 28° C. above the higher of the water dew point and the hydrocarbon dew point. The mercury waste from the process is produced as either an aqueous solution or a small volume of mercuric sulfide.

To reduce concern over condensed liquids, the temperature of the absorber is <=28° C. above the higher of the water dew point and the hydrocarbon dew point in one embodiment; <=10° C. above the higher of the water dew point and the hydrocarbon dew point in another embodiment; <=5° C. above the higher of the water dew point and the hydrocarbon dew point in a third embodiment; <=2° C. above the higher of the water dew point and the hydrocarbon dew point in a fourth embodiment; and equal to or less than the higher of the water dew point and the hydrocarbon dew point in a fifth embodiment.

The halogen is present in sufficient quantities in the organic solvent to remove at least a portion of the mercury in the gas phase. The halogen is I, in a molar ratio of I/Hg>=1.0 in one embodiment; in a molar ratio >=2.0 and less than or equal to 50 in a second embodiment; >=2.1 and <=10 in a third embodiment; and >=2.2 and less than or equal to 5 in a fourth embodiment.

In one embodiment, the mercury content of the gas is reduced by 50% or more. In another embodiment, it is reduced by 90% or more. In another embodiment, it is reduced by 95% or more. In another embodiment, it is reduced by 99% or more. In one embodiment, the mercury content of the gas is reduced to at or below 10 $\mu g/m^3$. In another embodiment, the mercury content of the gas is reduced to at or below 1 $\mu g/m^3$. In another embodiment, the mercury content of the gas is reduced to at or below 0.1 $\mu g/m^3$. In another embodiment, the mercury content of the gas is reduced to at or below 0.01 $\mu g/m^3$.

The gas to be treated to remove mercury should contain low levels of halogen-reactive impurities such as hydrogen sulfide, ammonia light mercaptans and carbonyl sulfide. If these are present in excessive amounts, the halogen will react with them rather than with the mercury. The halogen-reactive impurities can be removed by absorption and adsorption using processes well known in the art. Alternatively they can be oxidized to form species that are not halogen-reactive impurities. For the feed gas to the process, the concentration of halogen-reactive impurities of all types should be less than or equal to 25 ppm. In another embodiment, the concentration should be less than or equal to 10 ppm. In another embodiment, the concentration should be less than or equal to 1 ppm.

In one embodiment, the organic mercury-halogen complex in the organic solvent can be removed by extraction into an aqueous solution with a complexing agent to form an aqueous mercury complex, using at least a complexing agent as disclosed in U.S. Pat. No. 8,728,304, incorporated herein by reference in its entirety. In one embodiment, a complexing agent having a large equilibrium binding constant is selected. Examples include thiol groups, dithiocarbamic acid, thiocarbamic acid, thiocarbazone, cryptate, thiophene groups, thioether groups, thiazole groups, thalocyanine groups, thiourenium groups, amino groups, polyethylene imine groups, hydrazido groups, N-thiocarbamoyl-polyalkylene polyamino groups, derivatives thereof, and mixtures thereof. Other examples of complexing agents include but are not limited to hydrazines, sodium metabisulfite ($Na_2S_2O_5$), sodium thiosulfate ($Na_2S_2O_3$), thiourea, the group of sulfides, ammonium thiosulfate, alkali metal thiosulfates, alkaline earth metal thiosulfates, iron thiosulfates, alkali metal dithionites, alkaline earth metal dithionites, and mixtures thereof. Examples of sulfides include but are not limited to potassium sulfide, alkaline earth metal sulfides, sulfides of transition elements number 25-30, aluminum sulfides, cadmium sulfides, antimony sulfides, Group IV sulfides, and mixtures thereof.

In one embodiment, the inorganic sulfur complexing agents are oxygen-containing compounds such as thiosulfates and dithionites. Examples include alkali metal thiosulfates, alkaline earth metal thiosulfates, iron thiosulfates, alkali metal dithionites, and alkaline earth metal dithionites and mixtures thereof. Suitable alkali metal thiosulfates include ammonium thiosulfate, sodium thiosulfate, potassium thiosulfate, and lithium thiosulfate. Examples of alkaline earth metal thiosulfates include calcium thiosulfate and magnesium thiosulfate. Ferric thiosulfate exemplifies an iron thiosulfate which may be employed. Alkali metal dithionites include sodium dithionite and potassium dithionite. Calcium dithionite is suitable as an alkaline earth metal dithionite complexing agent.

In another embodiment, the complexing agent is a polyamine for forming stable cationic complexes with the ions of heavy metals. Exemplary polyamines include ethylenediamine (EDA), propylenediamine, triaminotriethylamine, diethylenetriamine, triethylenetetramine (TRIEN), tetraethylenepentamine and tetra-2-aminoethylethlenediamine. In one embodiment, the polyamine may include carboxyl groups, hydroxyl groups and/or other substituents, as long as they do not weaken the complex formed with polyamine. In one embodiment, the complexing agent is tetraethylenepentamine (TETREN), which forms a stable complex with mercury at a pH around 4.

In one embodiment, the complexing agent is selected from the group of DEDCA (diethyl dithiocarbamic acid) in a concentration of 0.1 to 0.5M, DMPS (sodium 2,3-dimercaptopropane-1-sulfonate), DMSA (meso-2,3-dimercaptosuccinic acid), EDTA (ethylene-diamine-tetra-acetic acid), DMSA (Dimercaptosuccinic acid), BAL (2,3-dimercapto-propanol), CDTA (1,2-cyclohexylene-dinitrilotetraacetic acid), DTPA (diethylene triamine pentaacetic acid), NAC(N-acetyl L-cystiene), sodium 4,5-dihydroxybenzene-1,3-disulfonate, polyaspartates; hydroxyaminocarboxylic acid (HACA); hydroxyethyliminodiacetic (HEIDA); iminodisuccinic acid (IDS); nitrilotriacetic acid (NTA), sodium gluconate, and other carboxylic acids and their salt forms, phosphonates, acrylates, and acrylamides, and mixtures thereof.

In one embodiment, sufficient complexing agent is provided to remove at least a portion of the mercury from the organic solvent. As the organic solvent is reused in the absorption process, it is not necessary to remove all of the organic mercury-halogen complex from the organic solvent. In one embodiment, the molar ratio of the complexing agent to mercury is >=1.0. In another embodiment, the molar ratio is >=2.0 and <=20,000. In yet another embodiment, the molar ratio is >=10 and <=1,000. In another embodiment, the molar ratio is >=50 and <=200.

Alternatively in one embodiment, the organic mercury-halogen complex can be adsorbed on a variety of solid adsorbents. Examples include sulfur-containing polymers, anion exchange resins, molecular sieves, zeolites, metal organic framework (MOF) materials, metal oxides and carbon treated with sulfur compounds. Examples of metal oxides include silicas, aluminas, silica-aluminas, zeolites, borosilicates, clays, synthetic layered materials such as hydrotalcite, zirconia, titania, diatomaceous earth, and composites such as FCC catalyst. Examples of the sulfur compounds used to treat the oxides include polysulfides, and thiosulfates.

The aqueous solution of mercury and complexing agent can be oxidized or sulfided to remove the mercury as HgS. The oxidation can be done with simple air or oxygen exposure, or by use of chemical oxidants such as hydrogen peroxide and hypochlorite solutions. The resulting HgS precipitate can then be disposed as a concentrated material in a small volume. It can be removed by settling, centrifugation, filtration, or combinations. The precipitated HgS can then be disposed in an appropriate hazardous waste landfill directly or after encapsulation in cement, plastic, ceramic or some other robust non-leachable material. The recovered HgS can also be retorted to recover liquid elemental mercury for use in appropriate devices such as fluorescent lights. The precipitated HgS can be also be recovered as a slurry and this slurry can be injected into an appropriate deep well designed for hazardous materials.

The aqueous solution used to extract the mercury complex will also contain halogen anions. Iodine is an expensive reagent, and can be recovered from the solution or from adsorbents used to remove the mercury captured in the organic solution, as described in Ullmann's Encyclopedia of Industrial Chemistry, Published Online: 15 Jun. 2000. Capther Iodine and Iodine Compounds by Phyllis A. Lyday, incorporated herein by reference in its entirety. In one embodiment, the aqueous solutions or the adsorbent is treated with chlorine ($Cl_2$) to oxidize the various iodine forms to $I_2$. The $I_2$ can be recovered by distillation. Other approaches to recover the iodide from the solution include ion exchange, adsorption, and fractional crystallization. Optionally at least a portion of the iodide and iodine in the spent adsorbent is recovered as iodine ($I_2$) and recycled to the process. Likewise bromine can be recovered in the same fashion.

Iodine is volatile and some of it may be stripped from the organic solvent. In one embodiment to minimize loss of iodine by vaporization, the temperature of the organic solution is kept as low as possible to lower the vapor pressure of the iodine. The temperature is 100° C. or less in one embodiment; 50° C. or less in a second embodiment; and 20° C. or less in a third embodiment. Iodine can also be adsorbed on a solid, for example by use of a bed of activated carbon. When it builds up on this bed, the iodine can be removed by passing a hot gas through it and routing this hot gas back to the organic solvent. In yet another embodiment, the iodine in the gas phase is routed to an absorber containing organic solvent without iodine. When the iodine is adsorbed in this solution, the solution can be used in upstream absorbers to capture mercury.

FIGURE ILLUSTRATING EMBODIMENTS

Reference will be made to FIG. 1 to further illustrate an embodiment of the invention.

As illustrated, two absorbers are used to remove mercury from natural gas. A portion of the solution from the last absorber in the series is cascaded to the previous absorber in the series. In this way, the halogen reagent can be used efficiently while maintaining very high removal efficiency of mercury from the gas. The first absorber operates at a I/Hg molar stoichiometry near 2.0 and removes most of the mercury while consuming most of the iodine. The second absorber operates at a I/Hg molar stoichiometry of 10. This reduces the mercury content of the gas to low levels. This embodiment also shows the extraction of the mercury complex from the organic solvent, and the precipitation of mercury sulfide.

A natural gas 10 containing mercury, e.g., 1000 µg/m³ of elemental mercury and having a temperature and a hydrocarbon dew point of 20° C. is fed to the bottom of a first absorber 20 operating at room temperature, e.g., 20° C. The gas flows upwards and contacts a first organic solvent containing iodine 31. In one embodiment, the molar ratio of I/Hg in this reactor is maintained at >1, e.g., at 2.1, by feeding a higher concentration iodine in organic solvent obtained from downstream in the process. The organic solvent from the bottom of the absorber 22 contains less than 1 ppm iodine and is recycled to the top of the reactor 31 by use of a pump 30. The treated gas from the first absorber 21 contains elemental mercury, e.g., 10 µg/m³, is fed to the bottom of a second absorber 40 also operating at room temperature.

The gas flows upwards and contacts a second organic solvent containing iodine 51. The molar ratio of I/Hg in this reactor is maintained at >1, e.g., at 10 by feeding a higher concentration iodine in organic solvent obtained from dissolving iodine 100 in the organic solvent obtained in the solvent regeneration part the process 81. The iodine is dissolved in this solvent by use of a mixer 90. The organic solvent from the bottom of the absorber 42 contains iodine, e.g., 10 ppm, and is recycled to the top of the reactor 51 by use of a pump 50. The treated gas from the second absorber 41 contains less than 0.01 µg/m³ of mercury.

Ten percent of the solvent from the first absorber 22 is sent by pump 30 to a mixer 70 where it contacts an equal volume of water that contains 0.1 wt % sodium thiosulfate 60. The effluent from the mixer 71 is sent to a separator which recovered the regenerated organic solvent 81. The aqueous effluent from the separator 82 is sent to a mixer 110 where it is mixed with a 1% hydrogen peroxide solution 150, e.g., at a stoichiometric ratio of 5 moles of peroxide to one mole of thiosulfate. This causes the mercury in this solution to precipitate as HgS. The effluent from the mixer 111 is sent to a settler 140 which recovers the HgS precipitate and an aqueous phase 130.

The first absorber operates at 500 psig and the second operates at 490 psig. Both absorbers contain ceramic packing which is resistant to iodine corrosion. The absorbers, pumps, structural supports, and lines carrying the organic solvent are coated with glass to resist corrosion by iodine. The size of the column and the rates of gas and liquid flow are selected from conditions to assure good contact following procedures known in the industry.

Other variations on this embodiment are within the spirit of the invention. A portion of the recovered aqueous phase 130 can be used to make up the aqueous thiosulfate solution 60. Iodide in the recovered aqueous phase 130 can be removed by anion exchange resin (not shown). Iodine can be recovered from this resin and used as a component in the iodine makeup 100. In another variation, one absorber can be used. In other variations, a three or more absorbers can be used. In other variations, a portion or all of the effluent 82 from mixer 80 can be reused in mixer 70. In other variations, the HgS in stream 111 is removed by filtration or centrifugation.

EXAMPLES

The following illustrative examples are intended to be non-limiting.

Example 1

In a three-neck flask with a Teflon stirrer (as glass reactor) was placed a 200 ml of solution of stannous chloride and sulfuric acid, for a concentration of 10% stannous chloride and 5% sulfuric acid. When mercury vapors were to be generated, 0.5 cc of a 209.8 ppm Hg solution of mercuric chloride in water was injected into the reactor via a septum. The stannous chloride rapidly reduced the mercury to elemental mercury. In the glass reactor was a line carrying 300 cc/min of nitrogen which bubbled in the reducing acidic stannous chloride solution. This was used to sweep the evolved elemental mercury to the downstream absorbers.

The glass reactor was connected to two absorbers in series, each of which contained 200 ml of solution. The absorbers were equipped with a glass frit to produce small bubbles. The bubbles contacted the absorbing solution for about one second. The first absorber contained the test solution. The first absorber contained a halogen dissolved in an organic solvent.

The second contained 3% sodium polysulfide in water. The 3% sodium polysulfide solution was prepared by dilution of a 30% solution of sodium polysulfide (TETRA-GARD™). This second absorber was a scrubber to remove the last traces of mercury from the nitrogen to provide mercury mass closures. Analysis of the exit gas from the second absorber by both Lumex and Jerome techniques found no detectable mercury.

Samples of the liquids in the reactor and two absorbers and gas leaving the reactor and leaving the two absorbers were drawn at periodic intervals over a ninety-minute period and analyzed for mercury by Lumex®. The limit of detection of the Lumex® is about 50 ppb, so values less than this are not demonstrably different from zero. Mercury balances over 57 runs average 98.6%. The reaction of the mercury chloride in the three neck flask is rapid, and the elemental mercury was stripped rapidly as well. After a typical ninety-minute period the conversion and displacement of mercury in the reactor averaged 94%.

The efficiency of the test solutions was calculated by comparing the amount of mercury taken up in the first reactor absorber to the amount taken up in both absorbers. If no mercury was taken up in the first reactor with the test solution, the efficiency would be zero percent. If all the mercury was taken up in the first reactor, the efficiency would be 100%. At the end of the experiments no visual evidence of precipitated HgS was observed in the absorbers.

Examples 2 to 8

The procedure of example 1 was used to evaluate the capture of gas phase elemental mercury. Superla™ white oil was the organic solvent, and various amounts of iodine were dissolved in it. Results are shown below in Table 1.

TABLE 1

| Example | $I_2$, ppm | I/Hg molar | Hg in 1st Absorber, ppb | Hg in Polysulfide, ppb | Hg Capture Efficiency |
|---|---|---|---|---|---|
| 2 | 15.95 | 20.71 | 636 | 6 | 98.87 |
| 3 | 6.35 | 8.24 | 809 | 2 | 99.63 |
| 4 | 3.20 | 4.15 | 1050 | 28 | 96.83 |
| 5 | 15.95 | 20.71 | 800 | 9 | 98.69 |
| 6 | 6.35 | 8.24 | 1040 | 6 | 99.24 |
| 7 | 3.20 | 4.15 | 617 | 14 | 97.29 |
| 8 | 1.60 | 2.08 | 924 | 41 | 94.82 |

These results show that iodine is very effective in capturing gas phase elemental mercury even when the molar ratio if I/Hg approaches the stoichiometric limit of 2.0 for the presumed reaction product, $HgI_2$.

Examples 9 to 13

10 ml of the organic solution from examples 4 to 9 were mixed with and equal volume of 1% sodium thiosulfate dissolved in DI water. The samples were mixed for 1 minute on a Vortex™ mixer and allowed to separate by standing at room temperature. The mercury contents of the oil and aqueous thiosulfate phases were measured by Lumex®. Results are summarized in Table 2.

TABLE 2

| Example | Oil from Previous Example | Initial Hg in Oil, ppb | Thiosulfate/Hg Molar Ratio | Extracted Oil Hg, ppb | Hg in Thiosulfate, ppb | % Hg Extracted |
|---|---|---|---|---|---|---|
| 9 | 4 | 1050 | 10,482 | 29 | 902 | 99 |
| 10 | 5 | 800 | 13,758 | 42 | 683 | 98 |
| 11 | 6 | 1040 | 10,583 | 38 | 819 | 91 |
| 12 | 7 | 617 | 17,839 | 53 | 986 | ~100 |
| 13 | 8 | 924 | 11,912 | 20 | 1036 | ~100 |

The mercury content remaining in the oil phase was almost always below the 50 ppb limit of detection of the Lumex®. Thus the remaining mercury in the oil was not demonstrably different from zero. The mercury contents of the aqueous thiosulfate phase show that aqueous thiosulfate is a highly effective ligand for transferring the organic mercury-halogen complex in the organic solution into an aqueous phase as an aqueous mercury complex.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A method for treating a gas stream to reduce its mercury concentration, the method comprising:
    contacting the gas stream having a first mercury concentration with a first organic solvent containing a halogen in a first absorber to extract at least a portion of the mercury from the gas stream forming a mercury-halogen complex in the first organic solvent and a treated gas having a reduced concentration of mercury, and
    contacting a portion of the first organic solvent containing the mercury-halogen complex with a complexing agent in water forming a recovered organic solvent and an aqueous phase containing an aqueous mercury complex wherein the treated gas has reduced concentration of mercury of less than 50% of the first mercury concentration, further comprising precipitating HgS from the aqueous phase by oxidation.

2. The method of claim 1, wherein the temperature of the first absorber is less than or equal to 28° C. above the higher of the water dew point of the gas stream and the hydrocarbon dew point of the gas stream.

3. The method of claim 2, wherein the temperature of the first absorber is less than or equal to 10° C. above the higher of the water dew point and the hydrocarbon dew point.

4. The method of claim 3, wherein the temperature of the first absorber is less than or equal to the higher of the water dew point and the hydrocarbon dew point.

5. The method of claim 2, wherein the first organic solvent containing a halogen has a concentration of halogen at a molar ratio of halogen to Hg of >2 and <=50.

6. The method of claim 1, wherein the first organic solvent containing a halogen has a concentration of halogen at a molar ratio of halogen to Hg of >1.0.

7. The method of claim 1, wherein the first organic solvent containing the mercury-halogen is brought into contact with the complexing agent at a molar ratio of complexing agent to mercury of >1.0.

8. The method of claim 7, wherein the first organic solvent containing the mercury-halogen is brought into contact with the complexing agent at a molar ratio of complexing agent to mercury ranging from 10 to 1000.

9. The method of claim 7, wherein at least a portion of the recovered organic solvent is used to prepare the first organic solvent.

10. The method of claim 1, further comprising removing HgS from the aqueous phase by any of settling, centrifugation, filtration, and combinations thereof.

11. The method of claim 1, wherein the treated gas has reduced concentration of mercury of <=1 μg/nm3.

12. The method of claim 1, further comprising treating the treated gas having a reduced concentration of mercury with a second organic solvent containing a halogen in a second absorber with a second organic solvent containing a halogen.

13. The method of claim 12, wherein the second organic solvent and the first organic solvent are the same.

14. The method of claim 1, wherein the gas stream to be treated comprises <25 ppm of halogen-reactive impurities.

15. A method for treating a gas stream to reduce its mercury concentration, the method comprising:
    with a first organic solvent containing a halogen in a first absorber to extract at least a portion of the mercury from the gas stream forming a mercury-halogen complex in the first organic solvent and a treated gas having a reduced concentration of mercury, and
    contacting a portion of the organic solvent containing the mercury-halogen complex with an adsorbent in an adsorber to form a recovered organic solvent, wherein the adsorbent is selected from the group consisting of sulfur-containing polymers, anion exchange resins, molecular sieves, zeolites, metal organic framework (MOF) materials, metal oxides treated with sulfur compounds, carbon treated with sulfur compounds, clays, synthetic layered materials, sulfur-treated MOFs, self-assembled monolayers on mesoporous supports, selenium modified adsorbents, and combinations thereof, wherein the treated gas has reduced concentration of mercury of less than 50% of the first mercury concentration.

16. The method of claim 15, wherein the temperature of the first absorber is less than or equal to 28° C. above the higher of the water dew point and the hydrocarbon dew point.

17. The method of claim 16, wherein the temperature of the first absorber is less than or equal to 10° C. above the higher of the water dew point and the hydrocarbon dew point.

18. The method of claim 17, wherein the temperature of the first absorber is less than or equal to the higher of the water dew point and the hydrocarbon dew point.

19. The method of claim 15, wherein the first organic solvent containing a halogen has a concentration of halogen at a molar ratio of halogen to Hg of >1.0.

20. The method of claim 19, wherein the first organic solvent containing a halogen has a concentration of halogen at a molar ratio of halogen to Hg of >2 and <=50.

21. The method of claim 15, further comprising: contacting the first organic solvent containing the mercury-halogen with a complexing agent at a molar ratio of complexing agent to mercury of >1.0.

22. The method of claim 15, wherein at least a portion of the recovered organic solvent is used to prepare the first organic solvent.

23. The method of claim 15, wherein the gas stream to be treated comprises <25 ppm of halogen-reactive impurities.

24. The method of claim 15, wherein the treated gas has reduced concentration of mercury of <=1 μg/nm3.

* * * * *